(12) United States Patent
Miller et al.

(10) Patent No.: US 9,330,697 B2
(45) Date of Patent: May 3, 2016

(54) CONSTRAINED DIMPLE PAD DAMPER FOR DISK DRIVE HEAD SUSPENSION

(71) Applicant: Hutchinson Technology Incorporated, Hutchinson, MN (US)

(72) Inventors: Mark A. Miller, Hutchinson, MN (US); Allan D. Tokuda, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/556,985

(22) Filed: Dec. 1, 2014

(65) Prior Publication Data

US 2015/0162033 A1    Jun. 11, 2015

Related U.S. Application Data

(60) Provisional application No. 61/912,113, filed on Dec. 5, 2013.

(51) Int. Cl.
*G11B 5/48*        (2006.01)

(52) U.S. Cl.
CPC .................................. *G11B 5/4833* (2013.01)

(58) Field of Classification Search
CPC ............................... G11B 5/48; G11B 5/4833
USPC ............................................ 360/245.5–245.9
See application file for complete search history.

(56) References Cited

U.S. PATENT DOCUMENTS

| | | | | |
|---|---|---|---|---|
| 5,956,212 A * | 9/1999 | Zhu | | 360/245.4 |
| 6,498,704 B1 * | 12/2002 | Chessman et al. | | 360/265.9 |
| 6,549,376 B1 * | 4/2003 | Scura et al. | | 360/245.3 |
| 7,336,444 B2 * | 2/2008 | Kido et al. | | 360/244.9 |
| 7,636,222 B1 * | 12/2009 | Dobosz et al. | | 360/265.9 |
| 7,724,476 B1 | 5/2010 | Bjorstrom et al. | | |
| 8,259,416 B1 * | 9/2012 | Davis et al. | | 360/245.1 |
| 8,369,046 B2 * | 2/2013 | Nojima | | 360/244.2 |
| 8,503,133 B2 * | 8/2013 | Arai et al. | | 360/245.9 |
| 8,582,243 B2 * | 11/2013 | Feng et al. | | 360/245.3 |
| 8,675,314 B1 | 3/2014 | Bjorstrom et al. | | |
| 8,681,456 B1 | 3/2014 | Miller et al. | | |
| 8,891,206 B2 | 11/2014 | Miller | | |
| 8,896,968 B2 | 11/2014 | Miller et al. | | |
| 8,896,969 B1 | 11/2014 | Miller et al. | | |
| 8,896,970 B1 | 11/2014 | Miller et al. | | |
| 2010/0142081 A1 * | 6/2010 | Funabashi et al. | | 360/75 |
| 2010/0277834 A1 * | 11/2010 | Nojima | | 360/244.2 |
| 2011/0058281 A1 * | 3/2011 | Arai et al. | | 360/245.9 |
| 2013/0047807 A1 * | 2/2013 | Sotokawa et al. | | 83/55 |
| 2014/0085754 A1 * | 3/2014 | Hanya et al. | | 360/244.5 |
| 2014/0085755 A1 * | 3/2014 | Hanya et al. | | 360/244.5 |
| 2014/0216221 A1 * | 8/2014 | Mashima | | 83/13 |

* cited by examiner

*Primary Examiner* — Allen T Cao
(74) *Attorney, Agent, or Firm* — Faegre Baker Daniels LLP (57) ABSTRACT

A disk drive head suspension including a load beam, a flexure on the load beam, and a load point dimple extending from the load beam toward the flexure. A constrained damper is located on the flexure and is engaged by the load point dimple. The constrained damper includes a layer of viscoelastic material on the flexure, and a metal constraining layer on the viscoelastic material. The flexure can be a co-located dual stage actuated flexure that includes a motor, and the constrained damper can be located on the motor.

19 Claims, 10 Drawing Sheets

CONSTRAINED DIMPLE PAD DAMPER FOR DISK DRIVE HEAD SUSPENSION

CROSS-REFERENCE TO RELATED APPLICATION

This application claims the benefit of U.S. Provisional Application Ser. No. 61/912,113, filed on Dec. 5, 2013, which is incorporated herein by reference in its entirety for all purposes.

TECHNICAL FIELD

The present invention relates generally to disk drive head suspensions and components such as flexures for disk drive head suspensions. In particular, the invention relates to load point dimples for such head suspensions and components.

BACKGROUND

Disk drive head suspensions often include a load point between the load beam and flexure components. The load point transfers the spring force generated by the suspension to a slider mounted to the flexure, and provides a point about which the slider can move or gimbal in pitch and roll directions. In some suspensions the load point is a dimple formed in a load point region or tongue of the flexure and engages the load beam. In other suspensions the load point is a dimple formed in a load point region of the load beam and engages the flexure tongue or slider. Suspensions having load points of these and other types are disclosed, for example, in the Davis U.S. Pat. No. 8,259,416 and the Scura U.S. Pat. No. 6,549,376.

There remains a continuing need for improved head suspension load point structures. Load points that enhance the performance of the suspension would be particularly advantageous.

DETAILED DESCRIPTION

Figure 1:
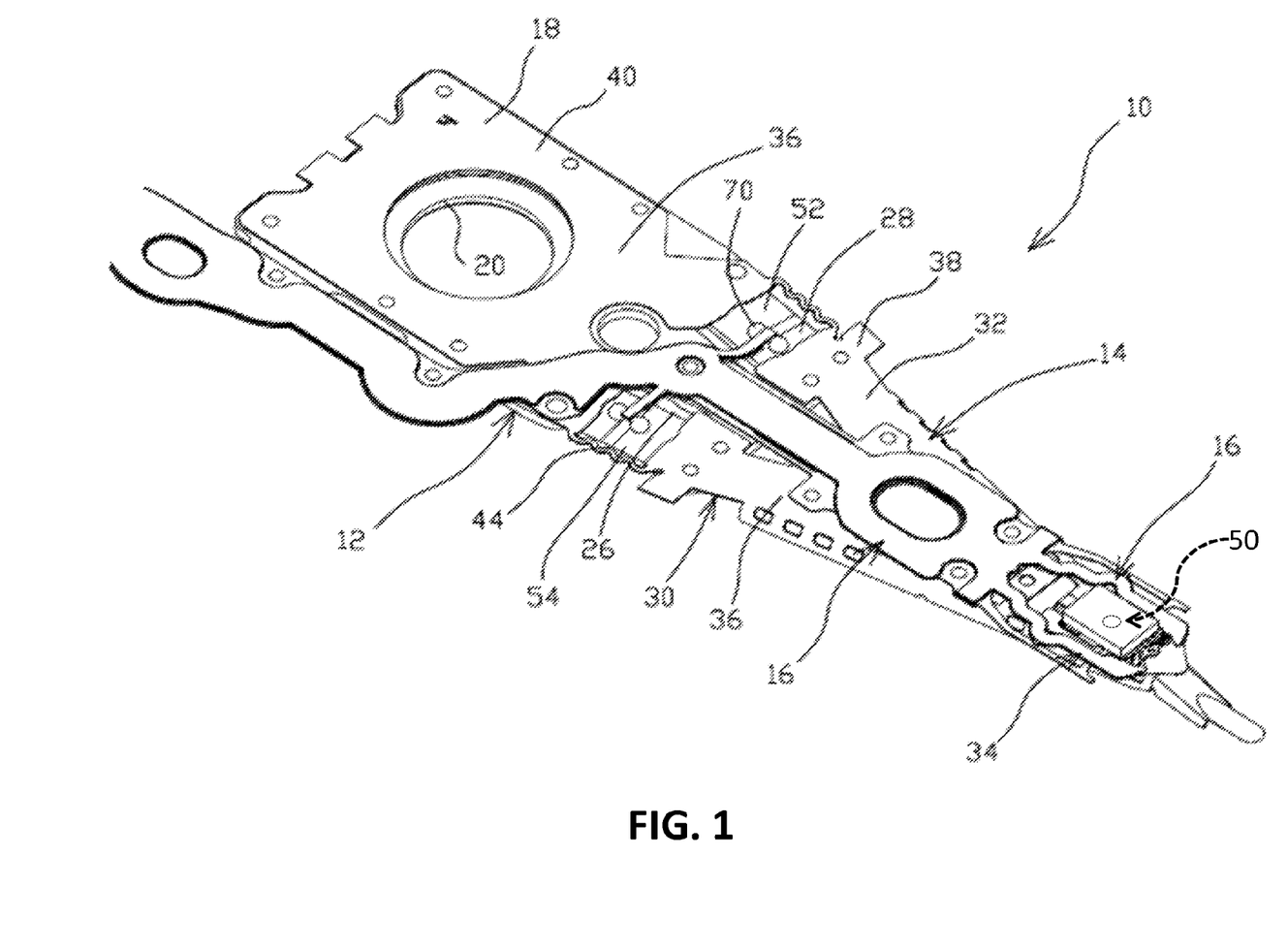
FIG. 1 is an isometric view of the flexure side of an exemplary disk drive head suspension having a constrained dimple pad damper in accordance with various embodiments of the disclosure.
Figure 2:
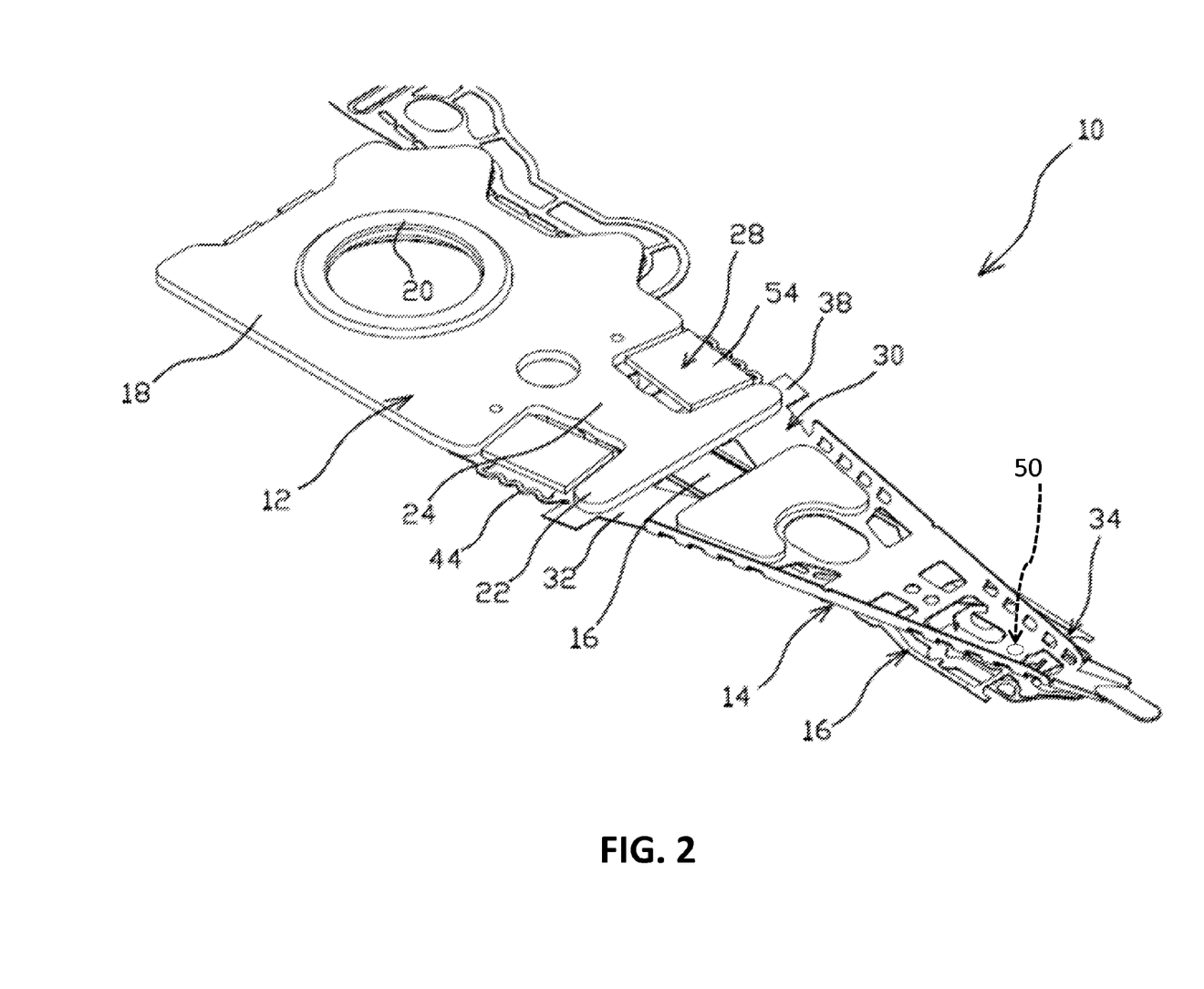
FIG. 2 is an isometric view of the load beam side, or the opposite side, of the suspension shown in FIG. 1.

FIG. 1 is an isometric view of the flexure side of a disk drive head suspension 10 with a constrained load point structure 50 in accordance with various embodiments of the disclosure. FIG. 2 is an isometric view of the load beam side of the suspension 10 shown in FIG. 1, illustrating the opposite side of the suspension shown in FIG. 1. The constrained load point structure 50 is shown in greater detail in FIG. 3. Although shown as a dual-stage actuated (DSA) suspension, other embodiments are not dual-stage actuated.

As perhaps best shown in FIGS. 1 and 2, the disk drive head suspension 10 includes a mounting/base plate 12, a load beam 14 and a flexure 16. The mounting/base plate 12 has a proximal end 18 (with a boss tower 20 in the illustrated embodiment), a distal end 22 and a linkage 24 between the proximal and distal ends. Also located between the proximal and distal ends 18 and 22 of the mounting/base plate 12 are one or more openings 26 (two are shown in the illustrated embodiment). A PZT motor 28 is mounted to the suspension 10 in each of the openings 26. The load beam 14 is connected to the distal end 22 of the mounting/base plate 12 by a hinge or spring region 30. In the illustrated embodiment the spring region 30 has two laterally-spaced arms 32. The flexure 16 has a gimbal region 34 that is located at the distal end of the load beam 14.

In the illustrated embodiment of suspension 10, much of the load beam 14 and the spring region 30 are formed from a layer of spring metal 36 such as stainless steel. Portions 38 of this stainless steel layer 36 extending proximally from the arms 32 of the spring region 30 are mounted (e.g., by welding) to the distal end 22 of the mounting/base plate 12. A proximal portion 40 of the stainless steel layer 36 overlays the mounting/base plate 12 and is connected to the portions 38 of the stainless steel layer mounted to the distal end 22 of the mounting/base plate by encapsulant barriers 44 extending across the PZT openings 26 in the illustrated embodiment. In this embodiment the proximal portion 40, encapsulant barrier 44, spring region 30 and load beam 14 are all formed from a unitary piece of stainless steel 36. In other embodiments (not shown), these components are formed from two or more separate pieces of stainless steel in other embodiments.

The linkage 24 enables the distal end 22 of the mounting/base plate 12 (and therefore the load beam 14, flexure 16 and gimbal region 34) to rotate or move (generally in the plane of the mounting/base plate) with respect to the proximal end 18 of the mounting/base plate when driven by the PZT motors 28 (i.e., the dual-stage or second-stage actuation). The components of the suspension 10 can be of conventional or otherwise known design. The load point structure 50 extends between the load beam 14 and the flexure 16 in the gimbal region 34.

Figure 3:
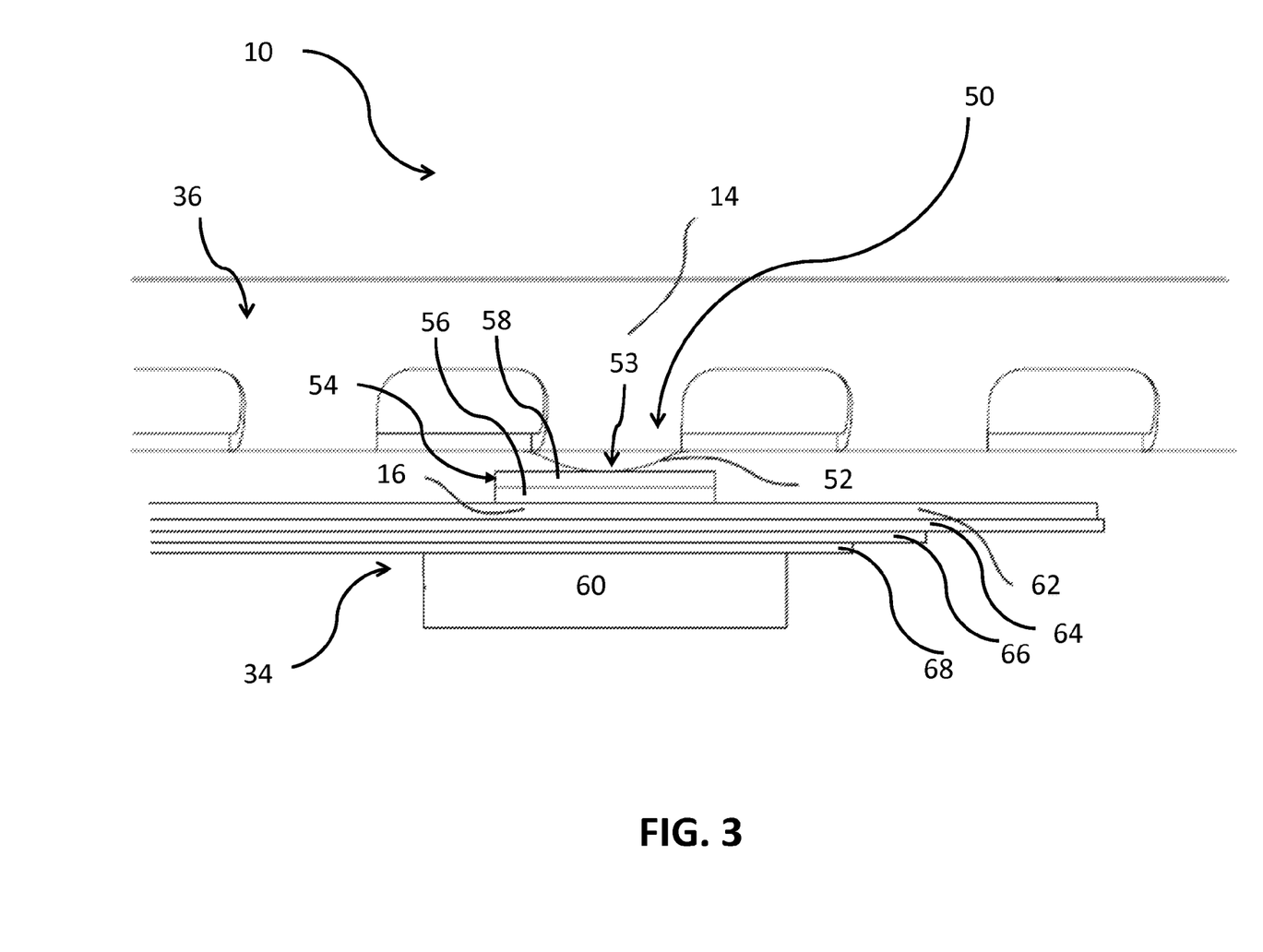
FIG. 3 is a detailed side view of the suspension shown in FIGS. 1 and 2 in accordance with various embodiments of the disclosure showing the load point and the constrained damper.

As perhaps best shown in FIG. 3 representing a side view of the suspension 10, the constrained load point structure 50 includes a load point 52 and a constrained damper 54. In the embodiment shown, the load point 52 is a dimple formed in the stainless steel 36 of the load beam 14, which engages the constrained damper 54 generally at an apex 53 of the load point 52. The constrained damper 54 has a viscoelastic layer 56 and a constraining layer 58 on the viscoelastic layer. The constraining layer 58 is adjacent to the load point 52, and the viscoelastic layer 56 adjacent to the flexure 16. The load point 52 via the constrained damper 54 urges the gimbal region 34 of the flexure 16 out of a plane generally corresponding to a portion of the flexure 16 outside the gimbal region 34, causing a bend or transition in the flexure 16 at a desired location. Slider 60 is shown mounted to a slider mounting region on the opposite side of the flexure 16 in the gimbal region 34.

In various other embodiments (not shown), the load point 50 is formed as a dimple or other load-bearing structure in the flexure 16 extending between the load beam 14 and the flexure 16, and the constrained damper 54 is on the load beam 14.

In some embodiments of the disclosure, the constraining layer 58 has a diameter less than about 0.5 mm and a thickness less than about 30 micrometers; the viscoelastic material 56 has a thickness less than about 35 micrometers. The constraining layer 58 may be made of metal, such as stainless steel, and can further include a coating on a side engaged by the load point 52.

In the illustrated embodiment, the flexure 16 is an integrated lead flexure formed from overlaying layers including a spring metal layer 62 comprised of a metal such as stainless steel, an insulating layer 64 comprised of polyamide or other dielectric material, traces 66 comprised of copper or other conductive material, and a coverlay 68 comprised of polyamide or other dielectric material. The insulating layer 64 generally electrically isolates structures forming the traces 66 from adjacent portions of the spring metal layer 62. Coverlay 68 generally covers and protects structures forming the traces 66. As shown, the spring metal layer 62 is adjacent the constrained damper 54, and the coverlay 68 is adjacent the slider 60. In various embodiments (not shown), the flexure 16 is formed of one or more of a spring metal layer 62, insulating layer 64, traces 66, and coverlay 68.

Figure 4:
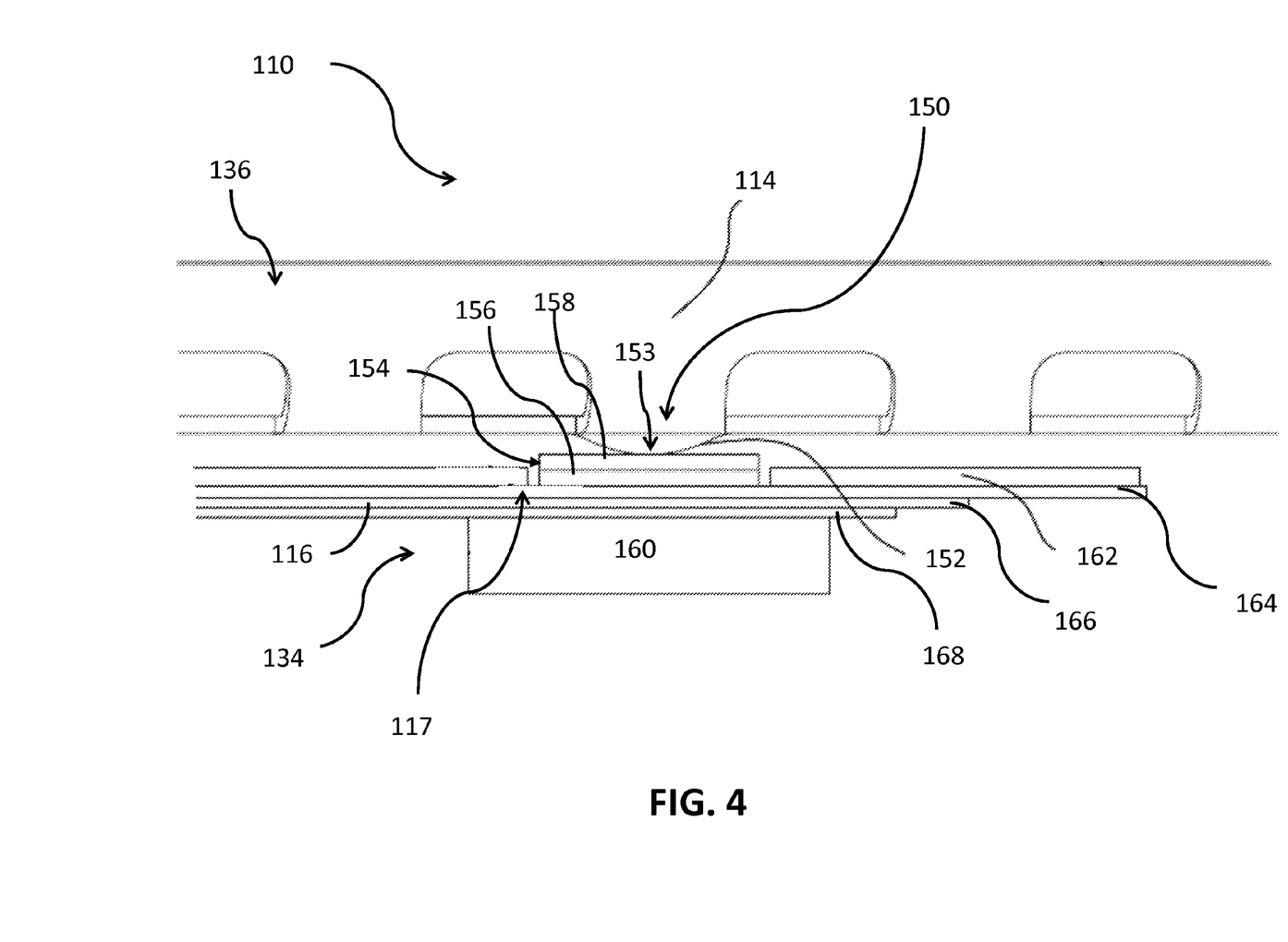
FIG. 4 is a detailed side view of a suspension similar to that shown in FIG. 3 having an aperture in one layer of the flexure in accordance with various embodiments of the disclosure.

FIG. 4 is a side view representing a suspension 110 having constrained load point structure 150 according to alternative embodiments of the disclosure. Suspension 110 shown in FIG. 4 is substantially similar to suspension 10 shown in FIG. 3 and similar elements are numbered accordingly. However, in suspension 110, an aperture 117 extends through a layer of the flexure 116 forming a hole in the spring metal layer 162, thereby exposing a portion of the insulating layer 164 and allowing the constrained damper 154 to be on the insulating layer 164 of the flexure 116 in the aperture 117. Constrained load point structure 150 is thereby recessed, lowering a z-height of the flexure 116 (i.e., compensating for the added height of the damper 154).

Figure 5:
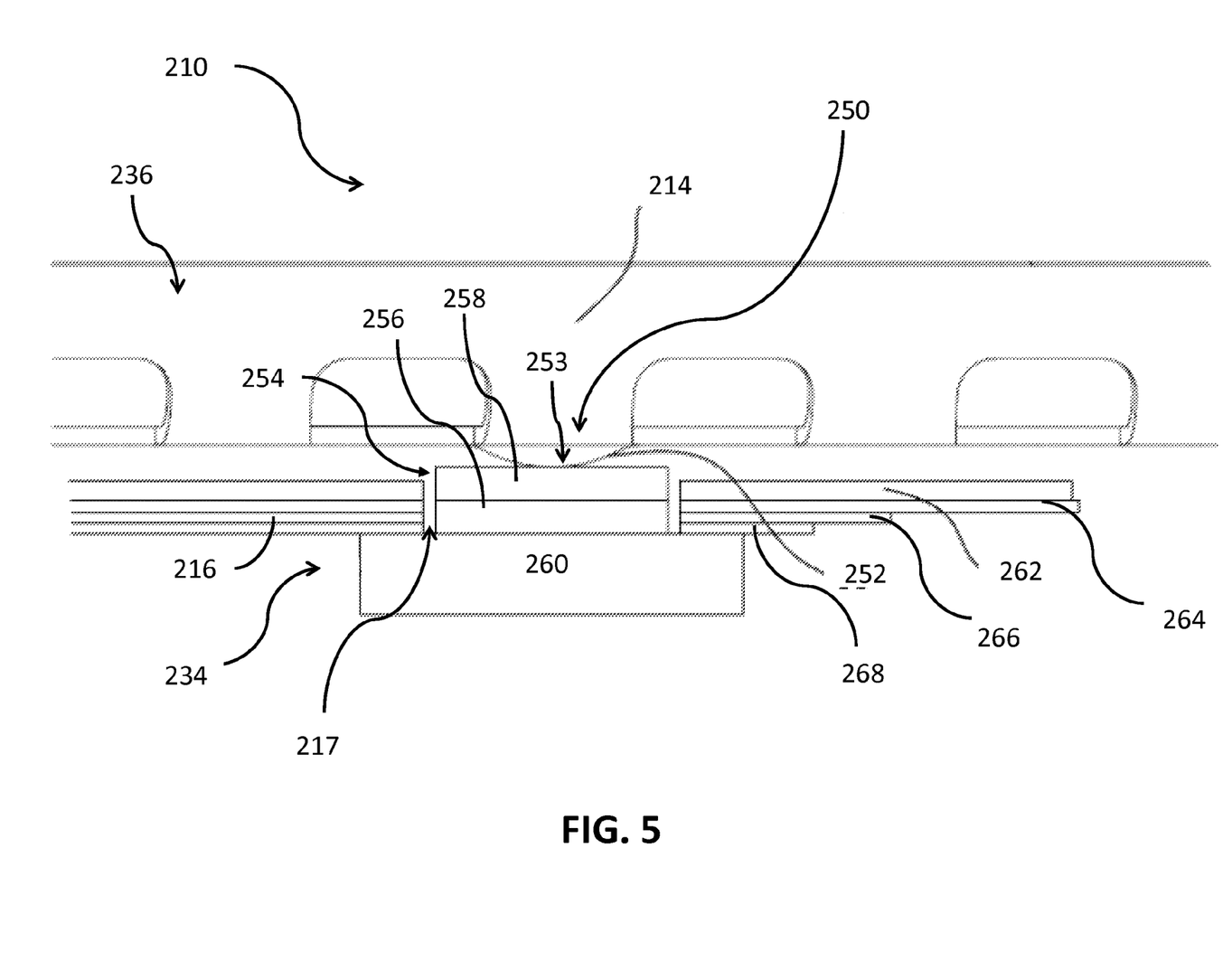
FIG. 5 is a detailed side view of a suspension similar to that shown in FIG. 3 having an aperture extending through multiple layers of the flexure in accordance with various embodiments of the disclosure.

FIG. 5 is a side view representing a suspension 210 having constrained load point structure 250 according to alternative embodiments of the disclosure. Suspension 210 shown in FIG. 5 is substantially similar to suspension 10 shown in FIG. 3 and similar elements are numbered accordingly. However, in suspension 210, an aperture 217 extends through more than one layer of the flexure 216 forming a hole in more than one of the spring metal layer 262, insulating layer 264, traces 266, and coverlay 268, thereby exposing a portion of the slider 260. The constrained damper 254 is on the slider 260 in the aperture 217 thereby further reducing the z-height of the flexure 216.

In other embodiments of the disclosure (not shown), an aperture 217 forms a hole in each of the spring metal layer 262 and insulating layer 264, thereby exposing the traces 266 and allowing the constrained damper 260 to attach to the traces 266 in the aperture 217. In further embodiments of the disclosure (not shown), the aperture 217 forms a hole in each of the spring metal layer 262, insulating layer 264, and traces 266, thereby exposing the coverlay 268 allowing the constrained damper 254 to be on the coverlay 268 in the aperture 217.

Figure 6:
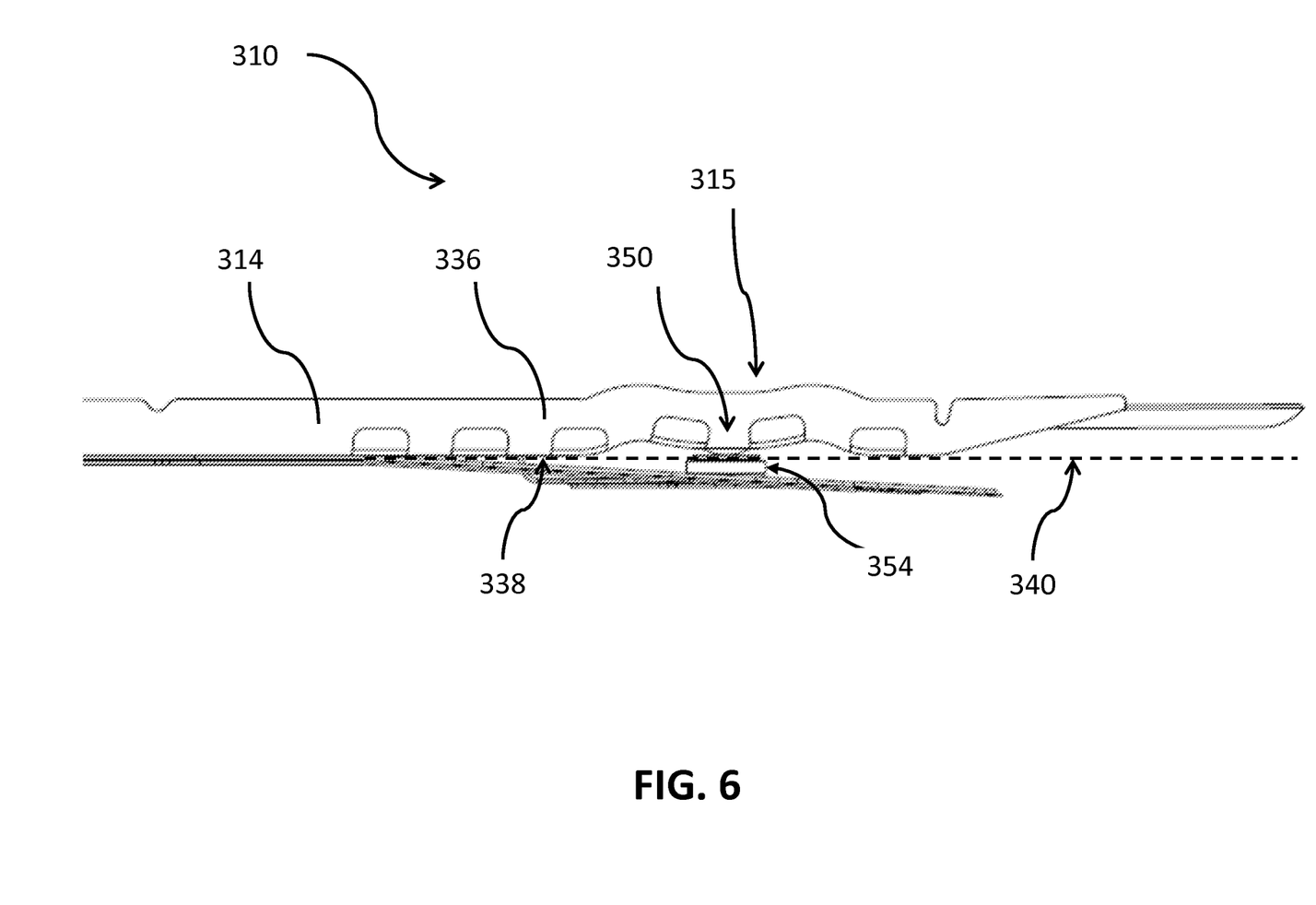
FIG. 6 is the side view of a disk drive suspension similar to that shown in FIGS. 1 and 2 having an inset region on the load beam according to some embodiments of the disclosure.
Figure 7:
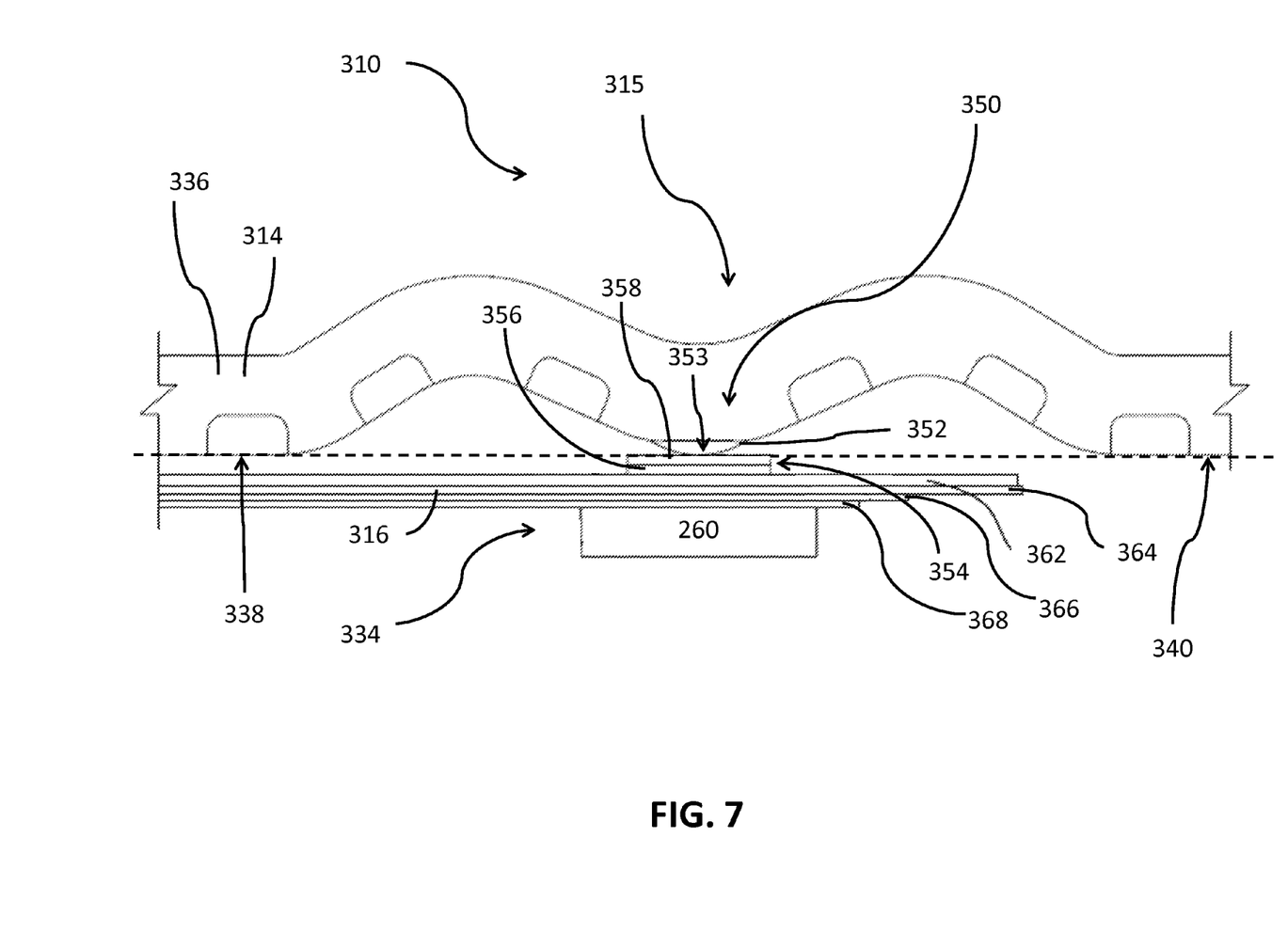
FIG. 7 is a detailed side view of the constrained load point structure of the disk drive suspension of FIG. 6.

FIGS. 6 and 7 are side views of a disk drive suspension 310 having a constrained load point structure 350 according to other embodiments of the disclosure. Suspension 310 shown in FIGS. 6 & 7 is substantially similar to suspension 10 shown in FIGS. 1, 2, and 3 and similar elements are numbered accordingly. However, in suspension 310, the load beam 314 comprises a spring metal member 336 having a major surface 338 and an inset region 315. The major surface 338 has a plane 340. The inset region 315 is formed out of the plane 340, allowing the load point 352 to engage the constrained damper 354 generally in plane 340. In other various embodiments of the disclosure (not shown), the load point 352 engages the constrained damper 354 in another plane generally parallel to plane 340 having a distance to plane 340 less than the height 353 of the load point 352.

In other embodiments (not shown), the suspension 310 comprises the load beam 314, having a spring metal member 336 with a major surface 338 and inset region 315, and any embodiment of the integrated lead flexure, including those shown in FIGS. 4 and 5, allowing the constrained damper 354 to be on various layers of the flexure, including at least one of the spring metal layer 160, insulating layer 162, traces 164, and coverlay 166.

Figure 8:
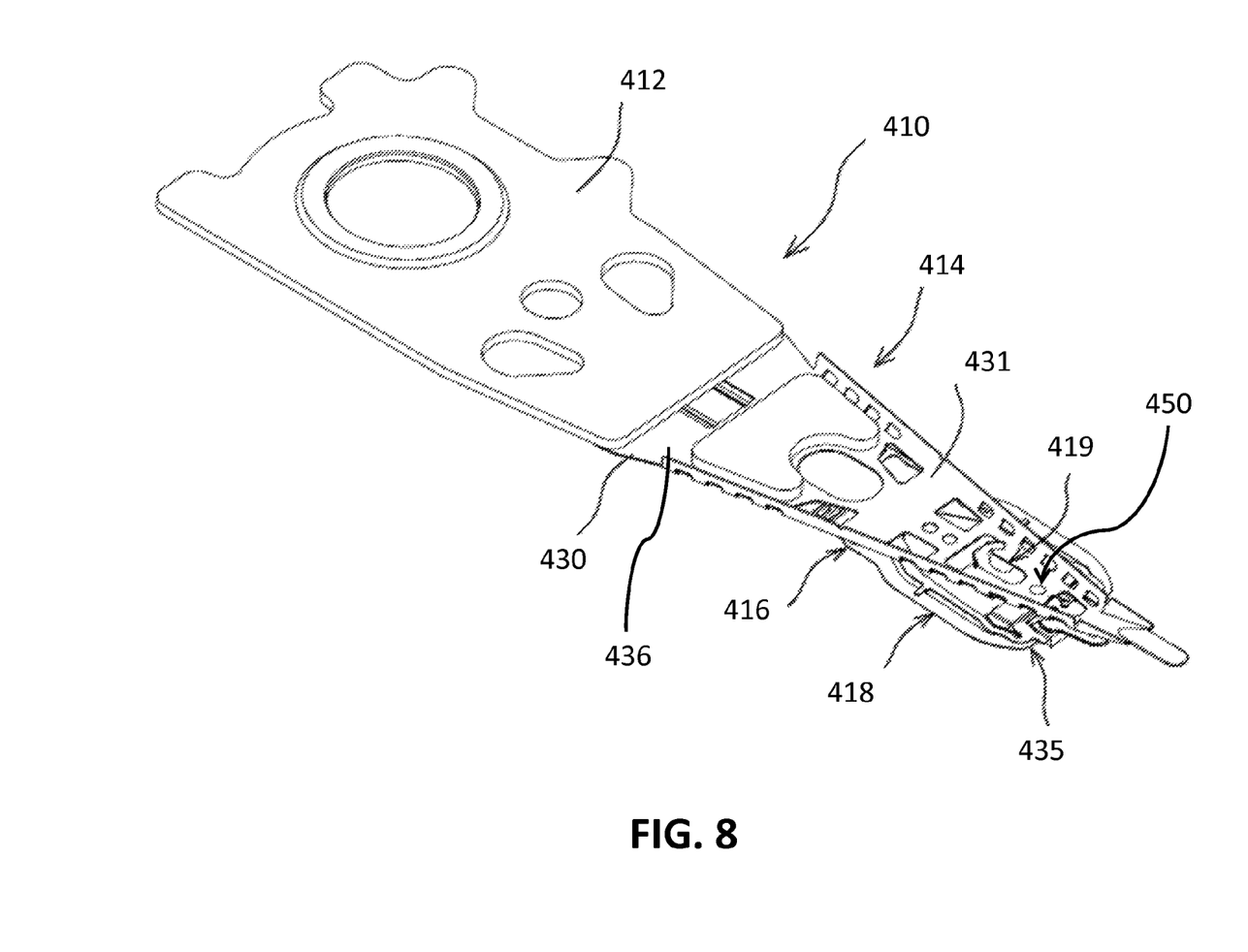
FIG. 8 is an isometric view of the load-beam side of a co-located dual stage actuation (DSA) flexure suspension having a constrained load point structure according to various embodiments of the disclosure.
Figure 9:
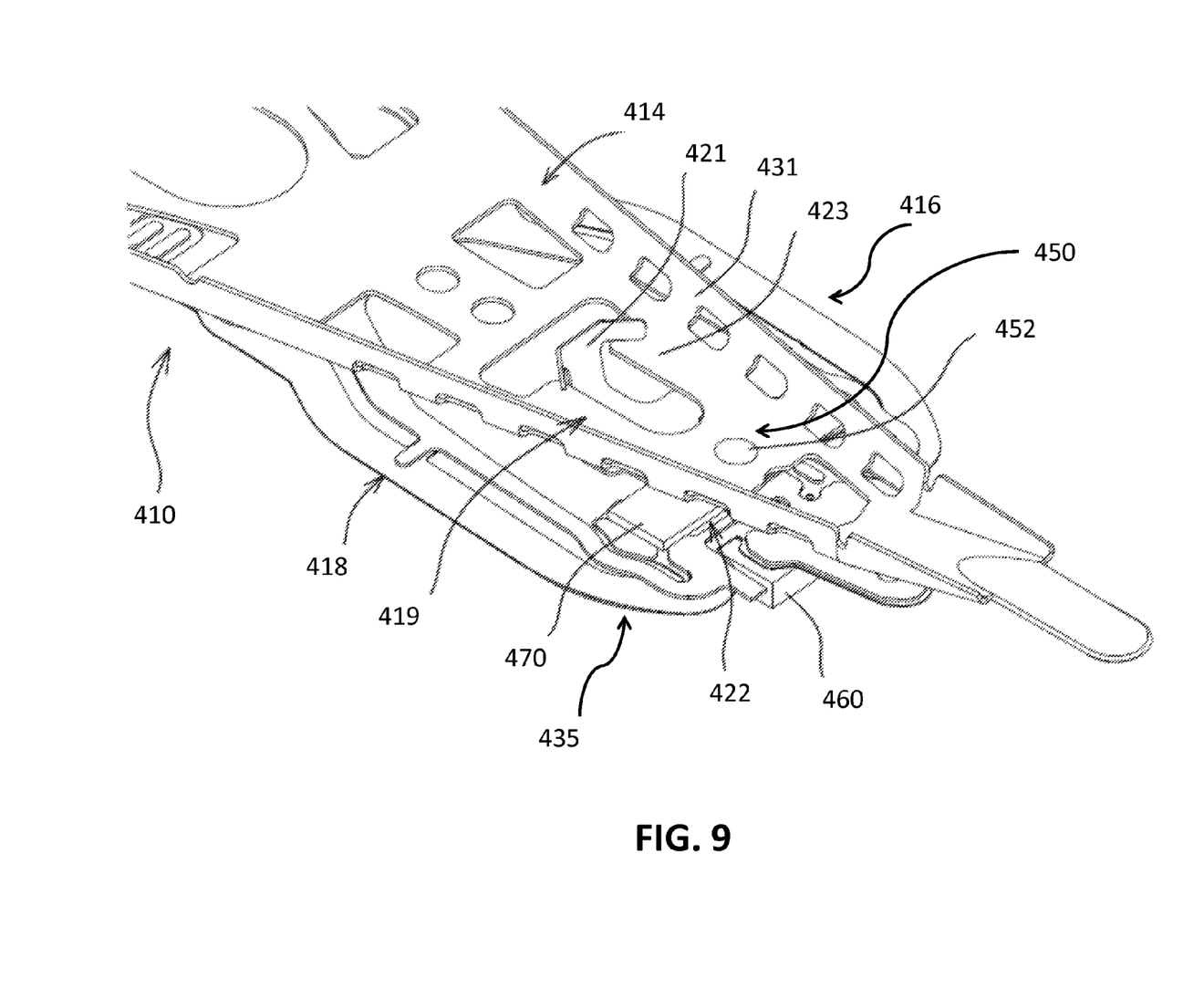
FIG. 9 is an isometric view of the distal end of the suspension shown in FIG. 8.
Figure 10:
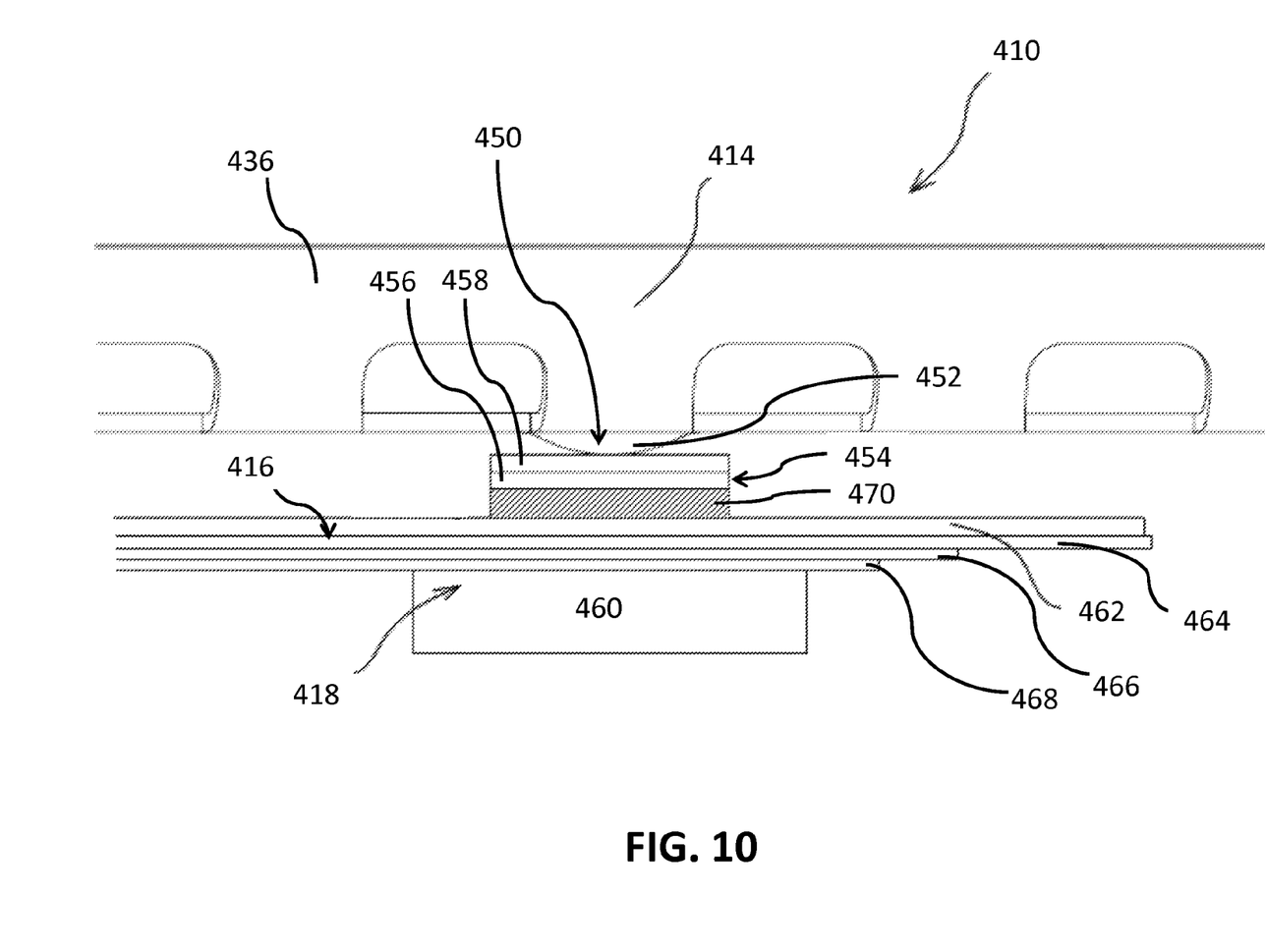
FIG. 10 is a detailed side view of the constrained load point structure of the suspension shown in FIGS. 8 and 9.

FIG. 8 is an isometric view of the load-beam side of a co-located dual stage actuation (DSA) flexure suspension 410 having a constrained load point structure 450 according to various embodiments of the disclosure. The suspension 410 has a flexure 416 with a co-located or gimbal-based dual stage actuation (DSA) structure 435 including the load point structure 450. FIG. 9 is a detailed isometric view of the distal end of suspension 410. FIG. 10 is a side view representing suspension 410 showing detail of the load point structure 450.

The suspension 410 includes a proximal mounting structure such as baseplate 412 and a load beam 414 (typically formed from a stainless steel layer 436) having a rigid or beam region 431 coupled to the baseplate by a spring or hinge region 430. Flexure 416 includes a gimbal 418 at its distal end. DSA structure 435 is located on the gimbal 418, adjacent the distal end of the load beam 414. The illustrated embodiment of suspension 410 also includes a gimbal limiter 419 comprising a tab 421 configured to engage a stop portion 423 of the load beam 414. A slider 460 is mounted to a tongue or slider mounting region 422 of the gimbal 418, on the side opposite the load beam 414. DSA structure 435 includes a motor 470, which is a PZT or other piezoelectric actuator in the illustrated embodiment, mounted to the mounting region 422 of the gimbal 418 between the load beam 414 and the slider 460.

A load point 452 is formed as a dimple extending from the load beam 414 and engages the motor 470. As described in greater detail below, in response to electrical drive signals applied to the motor 470, the motor drives portions of the gimbal 418, including the slider mounting region 422 and slider 460, about a generally transverse tracking axis.

FIG. 10 is similar to FIG. 3 and is numbered accordingly for similar elements, except that a motor 470 is mounted between the flexure 416 and the constrained damper 454. As shown, the motor 470 is on the flexure 416 and the constrained damper 454 is on the motor 470.

In various embodiments of the disclosure (not shown), the load beam 414 includes an inset region similar to that shown in FIG. 7. In various embodiments, the suspension 410 comprises any embodiment of the integrated lead flexure 416, including those shown in FIGS. 4 and 5, allowing the motor 470 to be mounted on various layers of the flexure 416, including at least one of the spring metal layer 462, insulating layer 464, traces 466, and coverlay 468.

Embodiments of the disclosure offer important advantages. For example, in some cases, sway gain is damped 8 to 11 decibel (dB), thereby increasing servo bandwidth approximately 500 Hertz (Hz). Also, in some cases, dimple wear can be decreased. Furthermore, the flexure can be efficiently manufactured, and the load point structures disclosed can be used with single stage actuation (SSA) or dual stage actuation (DSA) configurations.

Although the present invention has been described with reference to preferred embodiments, those skilled in the art will recognize that changes can be made in form and detail without departing from the spirit and scope of the invention. Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

What is claimed is:

1. A disk drive head suspension, including:
   a load beam;
   a flexure on the load beam;
   a load point extending between the load beam and flexure; and
   a constrained damper between the load beam and the flexure, wherein the constrained damper is engaged by the load point and includes:
      a layer of viscoelastic material on one of the load beam and flexure; and
      a constraining layer on the layer of viscoelastic material.

2. The disk drive head suspension of claim 1 wherein:
   the constraining layer has a diameter less than about 0.5 mm and a thickness less than about 30 μm; and
   the layer of viscoelastic material has a thickness less than about 35 μm.

3. The disk drive head suspension of claim 1 wherein the constraining layer is metal.

4. The disk drive head suspension of claim 3 and further including a coating on a surface of the metal constraining layer engaged by the load point.

5. The disk drive head suspension of claim 1 wherein:
   the load point is a formed dimple in one of the load beam and flexure; and
   the constrained damper is on the other of the load beam and flexure.

6. The disk drive head suspension of claim 1 wherein:
   the load beam includes an inset region; and
   the load point extends from the inset region of the load beam.

7. The disk drive head suspension of claim 6 wherein the load beam comprises a spring metal member having a major surface, and the inset region is formed out of a plane of the major surface and causes an apex of the load point to be located in a plane generally parallel to the plane of the major surface of the load beam.

8. The disk drive head suspension of claim 1 wherein the flexure is an integrated lead flexure including a stainless steel layer and:
   the load point extends from the load beam; and
   the constrained damper is on the flexure.

9. The disk drive head suspension of claim 8 wherein:
   the stainless steel layer of the flexure includes an aperture; and
   the constrained damper is on the flexure and in the aperture.

10. The disk drive head suspension of claim 9 further including a slider on the flexure and wherein the constrained damper is on the slider.

11. The disk drive head suspension of claim 1 wherein:
    the flexure is a co-located dual stage actuated flexure and includes a motor;
    the constrained damper is on the motor; and
    the load point extends from the load beam.

12. A disk drive head suspension, including:
    a load beam comprising a spring metal layer and a load point, and wherein the load point is optionally a formed dimple in the spring metal layer;
    an integrated lead flexure assembly mounted to the load beam, the flexure assembly including:
       a spring metal layer;
       traces;
       an insulating layer between the traces and spring metal layer; and
       a slider; and
    a constrained damper on the integrated lead flexure assembly, the constrained damper engaged by the load point and including:
       a layer of viscoelastic material; and
       a constraining layer on the layer of viscoelastic material.

13. The head suspension of claim 12 wherein the layer of viscoelastic material is on the spring metal layer of the flexure assembly.

14. The head suspension of claim 12 wherein:
    the spring metal layer of the flexure assembly includes an aperture; and
    the constrained damper is mounted to the flexure assembly in the aperture.

15. The head suspension of claim 12 wherein the spring metal layer of the load beam includes an inset portion and the load point is on the insert portion.

16. The head suspension of claim 15 wherein the spring metal layer of the load beam has a major surface, and the inset portion is formed out of a plane of the major surface and causes an apex of the load point to be located in a plane generally parallel to the plane of the major surface of the load beam.

17. A disk drive head suspension, including:
    a load beam comprising a spring metal layer and a load point, and wherein the load point is optionally a formed dimple in the spring metal layer;
    a co-located dual stage actuated integrated lead flexure assembly mounted to the load beam, the flexure assembly including:
       a spring metal layer;
       traces;
       an insulating layer between the traces and spring metal layer;
       a slider; and
       a motor; and
    a constrained damper on the integrated lead flexure assembly, the constrained damper engaged by the load point and including:
       a layer of viscoelastic material on the motor; and
       a constraining layer on the layer of viscoelastic material.

18. The head suspension of claim 17 wherein the spring metal layer of the load beam includes an inset portion and the load point is on the insert portion.

19. The head suspension of claim 18 wherein the spring metal layer of the load beam has a major surface, and the inset portion is formed out of a plane of the major surface and causes an apex of the load point to be located in a plane generally parallel to the plane of the major surface of the load beam.

* * * * *